(12) United States Patent
Uno et al.

(10) Patent No.: US 6,383,695 B1
(45) Date of Patent: May 7, 2002

(54) BLACK MATRIX FOR LIQUID CRYSTAL DISPLAY DEVICES AND COLOR FILTER

(75) Inventors: Toshiyuki Uno, Kanagawa; Yasuhiko Akao, Yamagata, both of (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/910,874

(22) Filed: Jul. 24, 2001

(30) Foreign Application Priority Data

Jul. 27, 2000 (JP) .......................................... 2000-227664
Mar. 2, 2001 (JP) ............................................ 2001-58773

(51) Int. Cl.7 ............................ G02B 5/20; G02F 1/1335
(52) U.S. Cl. .............................................. 430/7; 349/110
(58) Field of Search ................................ 430/7; 349/110

(56) References Cited

FOREIGN PATENT DOCUMENTS

| | | | | |
|---|---|---|---|---|
| EP | 0 901 032 A | * | 3/1999 | |
| JP | 10-301499 A | * | 11/1998 | |
| JP | 11-142617 A | * | 5/1999 | |

* cited by examiner

*Primary Examiner*—John A. McPherson
(74) *Attorney, Agent, or Firm*—Oblon, Spivak, McClelland, Maier & Neustadt, P.C.

(57) ABSTRACT

It is to provide a black matrix with which the etching rate during patterning can be controlled to be the same level as that of a metal chromium film, and which has adequate acid resistance, alkali resistance, heat resistance and water resistance in a color filter production process. At least one light shielding layer and a low-reflecting film as the case requires are formed on a transparent substrate, and the composition of the light shielding layer is substantially as follows:

| | |
|---|---|
| Ni | 40 to 80 mass % |
| Mo | 10 to 59 mass % |
| Ta + Nb | 0.5 to 8 mass % |
| Fe + Al | 0.5 to 10 mass % |
| Zr | 0 to 7 mass %. |

20 Claims, 1 Drawing Sheet

BLACK MATRIX FOR LIQUID CRYSTAL DISPLAY DEVICES AND COLOR FILTER

BACKGROUND OF THE INVENTION

1. Field of the Invention

The present invention relates to a black matrix for color filters or TFT arrays to be used for e.g. flat panel displays represented by color liquid crystal display devices.

2. Discussion of Background

Flat panel displays represented by color liquid crystal display devices are more actively used as information devices, as monitor displays for notebook computers and as dynamic image displays for TV image. Particularly in recent years, the TV broadcasting has been decided to be digitized, and accordingly, it is believed certain that color liquid crystal display devices will be used as TV receivers in future instead of cathode ray tubes which are widely used at present.

In these color liquid crystal display devices, a color filter substrate or the like to be used is provided with a black matrix so as to increase display quality such as display contrast of the image.

The black matrix shades the periphery of the display portion of each color picture element of three primary colors R, G and B adjacent to each other of a color filter to prevent bleeding of each color and color mixture is thereby prevented, and the black matrix is commonly used to improve the contrast of the color display and to increase the display quality.

As a material for the black matrix, a metal chromium film is usually used from such reasons that film formation is easy and production is easily carried out in a color liquid crystal display devices production process, a strong film can be formed, it is stable as a liquid crystal display panel and is highly reliable, and adequate light shielding properties can be obtained. Further, in order to make the black matrix low-reflecting, a method of constituting a multi-layer structure is employed wherein e.g. a chromium oxide film, a chromium oxynitride film or a chromium oxycarbide film is deposited either or both on and below the metal chromium film. The metal chromium film and the like are used to form a black matrix by forming patterns utilizing known photolithography.

The metal chromium film and the like are commonly used since the degree of light shielding is high and a high light shielding property with which the optical density (OD value) at the visible light region becomes at a level of 4.5 is relatively easily obtained, even if they are relatively thin films as mentioned above, the variation with time is slight, and fine patterns can be formed by conventional photolithography. However, a large amount of labor and cost are required for handling of an etchant, treatment and control of the effluent, when patterning on the metal chromium film and the like is carried out.

On the other hand, as a substrate for the metal chromium film, employment of a photosensitive resin film is expected for a black matrix for liquid crystal display devices. However, a film thickness at a level of from 1.5 to 2.0 $\mu$m will be necessary to obtain a light shielding property at the same level as a chromium film. Since the thickness of each of colored films of R, G and B is at a level of from 1.0 to 1.5 $\mu$m, the overlaid portion which is formed to prevent bleeding at the periphery of each picture element has a height of from about 2 to about 3 $\mu$m, which deteriorates flatness of a color filter. Further, the resin black matrix is thick, whereby a pattern may drop out during development or it may overhang in photolithography process, and accordingly it tends to be difficult to form a black matrix with a high precision.

In order to overcome the above problems, it has been proposed to use a Ni—Mo type metal as a substitute for the metal chromium film (JP-A-9-243801, JP-A-10-301499, JP-A-11-142617). However, of films as specifically disclosed in these literatures, the etching rate is significantly different from the etching rate of a chromium film, whereby large-scale renovation of production apparatus or change of etching conditions is required to employ such films.

SUMMARY OF THE INVENTION

To overcome the above problems, the present invention provides a black matrix for liquid crystal display devices which comprises at least one light shielding layer, wherein the light shielding layer substantially comprises the following components:

| | |
|---|---|
| Ni | 40 to 80 mass % |
| Mo | 10 to 59 mass % |
| Ta + Nb | 0.5 to 8 mass % |
| Fe + Al | 0.5 to 10 mass %. |

The present invention further provides a black matrix for liquid crystal display devices which comprises at least one light shielding layer, wherein the light shielding layer substantially comprises the following components:

| | |
|---|---|
| Ni | 40 to 80 mass % |
| Mo | 10 to 59 mass % |
| Ta | 0.5 to 8 mass % |
| Fe | 0.5 to 10 mass %. |

The present invention further provides a black matrix for liquid crystal display devices which comprises at least one light shielding layer, wherein the light shielding layer substantially comprises the following components:

| | |
|---|---|
| Ni | 60 to 78 mass % |
| Mo | 12 to 30 mass % |
| Ta + Nb | 2 to 7 mass % |
| Fe + Al | 1 to 6 mass %. |

The present invention still further provides a black matrix for liquid crystal display devices which comprises at least one light shielding layer, wherein the light shielding layer substantially comprises the following components:

| | |
|---|---|
| Ni | 60 to 78 mass % |
| Mo | 12 to 30 mass % |
| Ta | 2 to 7 mass % |
| Fe | 1 to 6 mass %. |

According to the present invention, a black matrix, a production line for which can easily be substituted with that for patterning of a black matrix made of a metal chromium film, which is resistant to e.g. an alkali liquid or an acid to be used in production process of a color filter, and which is highly reliable, can be obtained.

DETAILED DESCRIPTION OF THE PREFERRED EMBODIMENTS

Figure 1A:
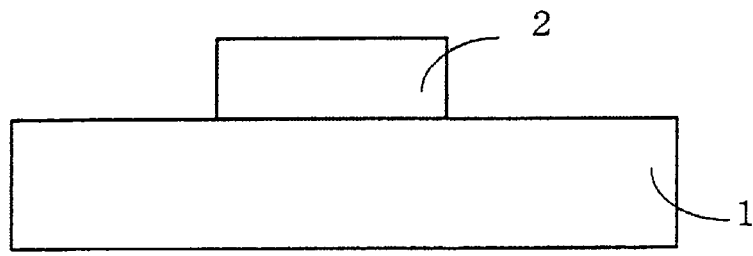
FIGS. 1(A), 1(B), 1(C) and 1(D) are cross-sectional views illustrating a constitution of the black matrix of the present invention.
Figure 1B:
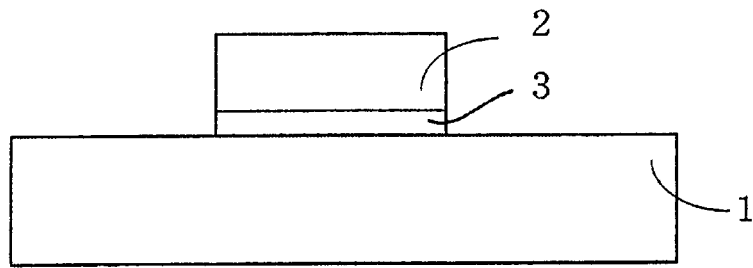
Figure 1C:
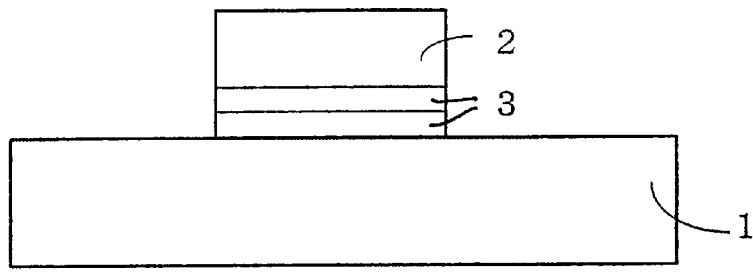
Figure 1D:
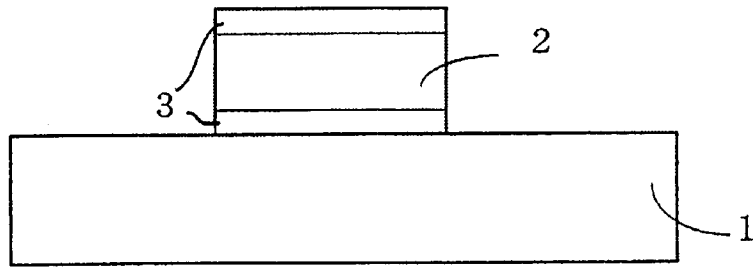

Now, the present invention will be explained in detail with reference to FIGS. 1(A), 1(B), 1(C) and 1(D). The black matrix of the present invention may be prepared in any form such that a light shielding layer 2 alone is formed on a transparent substrate 1 as illustrated in FIG. 1(A), a low-reflecting film 3 is formed on a transparent substrate 1 and then a light shielding layer 2 is laminated thereon as illustrated in FIG. 1(B), first and second low-reflecting films 3 are formed on a transparent substrate 1 and then a light shielding layer 2 is laminated thereon as illustrated in FIG. 1(C), and a low-reflecting film 3 is formed on a transparent substrate 1, a light shielding layer 2 is laminated thereon, and a low-reflecting film 3 is further laminated thereon as illustrated in FIG. 1(D). Among these forms, in a case where a high durability against a chemical is required, preferred is a constitution wherein the outermost layer is a light shielding layer as illustrated in FIG. 1(A), 1(B) or 1(C).

Now, the composition of the light shielding layer of the black matrix of the present invention will be explained below.

With respect to the composition of Ni and Mo to be a medium of the light shielding layer to be used for the black matrix of the present invention, the Ni content is at most 80 mass % and the Mo content is at least 10 mass % in order to secure the acid resistance. Preferably the Ni content is at most 78 mass % and the Mo content is at least 12 mass %, particularly preferably the Mo content is at least 14 mass %. Further, the Ni content is at least 40 mass % and the Mo content is at most 59 mass % in order to secure the water resistance and alkali resistance. The Ni content is preferably at least 60 mass %, particularly preferably at least 70 mass %, and the Mo content is preferably at most 30 mass %, particularly preferably at most 24 mass %.

Ta and Nb are components which ate effective for control of the etching rate. If their amount is too large, the "residue" tends to remain after etching, and the water resistance tends to be significantly deteriorated, and accordingly their amount is at most 8 mass % in total. The total amount is preferably at most 7 mass %. Further, they are added in a total amount of at least 0.5 mass % so as to bring the etching rate to be close to that of a metal chromium film. The total amount is preferably at least 2 mass %, more preferably at least 3 mass %.

Here, Ta is a component which is particularly effective for control of the etching rate. If its amount is too large, the "residue" tends to remain after etching, and the water resistance tends to be significantly deteriorated, and accordingly its amount is at most 8 mass %. It is preferably at most 7 mass %. Further, it is preferred to add Ta in an amount of at least 0.5 mass % so as to bring the etching rate to be close to that of a metal chromium film. It is preferably at least 2 mass %, more preferably at least 3 mass %.

Fe and Al are components which are effective to improve water resistance. If their amount is less than 0.5 mass % in total, no adequate effect of improving water resistance tends to be obtained. Their amount is preferably at least 1 mass % in total. On the other hand, if their amount is too large, the acid resistance may decrease, and accordingly their amount is at most 10 mass % in total. Their amount is preferably at most 6 mass % in total.

Here, particularly Fe is a component which is effective to improve the water resistance and to lower the etching rate by the synergistic effect with Ta to bring the etching rate to be close to that of a metal chromium film. It is contained in an amount of preferably at least 0.5 mass %, more preferably at least 1 mass %. On the other hand, if its amount is too large, the etching rate tends to be too low, and accordingly its amount is at most 10 mass %. It is preferably at most 6 mass %.

Zr is not essential, but it has an effect to adjust the etching rate and to improve the acid resistance by addition in an appropriate amount, and accordingly it may be added in an amount of at most 7 mass %. If the content exceeds 7 mass %, deterioration of the water resistance tends to be significant. It is preferably at most 4 mass %. It is preferably contained in an amount of at least 0.5 mass % so as to increase the acid resistance. The light shielding layer may consist of a pure alloy, but may contain nitrogen. Nitrogen has an effect to significantly increase the etching rate. However, if the content of nitrogen is too large, the light shielding s property may be impaired, and accordingly it is preferably at most 40 atomic % based on the entire light shielding layer. It is particularly preferably at most 20 atomic %. Further, nitrogen has an effect to improve the acid resistance which is lowered by addition of Fe. From such a viewpoint, it is preferred to incorporate nitrogen in an amount of at least 2 atomic, particularly preferably at least 4 atomic % Further, oxygen or carbon as an impurity may be contained within a range of not impairing the effects of the present invention.

As mentioned above, nitrogen has an effect to increase the etching rate. Accordingly, when the etching rate is made to be low in a state where no nitrogen is contained, the etching rate can be adjusted to the desired rate by adjusting addition amount of nitrogen. Specifically, the amount of nitrogen in an atmospheric gas during sputtering is preferably from 2 to 40 vol %, particularly preferably from 5 to 25 vol %, based on the entire atmosphere.

Specifically, other components are adjusted so that the etching rate will be from 0.5 to 2 nm/sec when etching is carried out under such conditions that the light shielding layer is soaked in a mixed liquid containing 12 mass % of ammonium cerium(IV) nitrate and 6 mass % of perchloric acid at 25° C. with stirring. Accordingly, the etching rate can be controlled to approximately 3 nm/sec which is the etching rate in a conventional etching line only by adjustment of the content of nitrogen.

In the present invention, the black matrix may further contain at least one low-reflecting film. Preferably the metal component composition of the low-reflecting film is substantially the same as that of the light shielding layer in view of production efficiency, but it may be different from that of the light shielding layer so as to obtain optimum properties as a low-reflecting film. For example, substantially the following metal component composition may be mentioned:

| | |
|---|---|
| Ni | 40 to 80 mass %, |
| Mo | 10 to 60 mass %, |
| Ta + Nb | 0 to 8 mass %, |
| Fe + Al | 0 to 10 mass % and |
| Zr | 0 to 7 mass %. |

In this case, Ni and Mo are essential components, and Ta, Nb, Fe, Al and Zr are optional components. In this case also, it is preferred to use Ta rather than Nb, and it is preferred to use Fe rather than Al. Accordingly, preferred is the following metal component composition:

| | |
|---|---|
| Ni | 40 to 80 mass %, |
| Mo | 10 to 60 mass %, |
| Ta | 0 to 8 mass %, |
| Fe | 0 to 10 mass % and |
| Zr | 0 to 7 mass %. |

Further, as the entire low-reflecting film, preferred is the following composition:

| | |
|---|---|
| Metal components | 30 to 80 atomic %, |
| Oxygen | 5 to 65 atomic %, |
| Nitrogen | 0 to 50 atomic %, |
| Oxygen + Nitrogen | 20 to 70 atomic %, and |
| Carbon | 0 to 15 atomic %. |

Oxygen is an essential component to secure the low-reflecting property. Further, carbon and/or nitrogen may be added to control the etching rate although it is not essential.

The light shielding layer and the low-reflecting film can be prepared by DC sputtering in a vacuum chamber by using, for example, a metal target consisting of an appropriate metal composition.

In a case where the light shielding layer is formed, Ar may be mainly used as the atmospheric gas, and a gas such as $N_2$ in an amount of at most 40 vol % for example may be mixed with Ar from the viewpoint of decrease in tensile stress of the film and control of the etching rate. In a case where the low-reflecting film is formed, as the atmospheric gas, one having $O_2$ or $CO_2$ mixed with Ar, one having $O_2$ or $CO_2$ mixed with $N_2$, one having $N_2$ and $CO_2$ mixed with Ar, or one having $N_2$ and $O_2$ mixed with Ar, is used, and a desired low-reflecting film can be formed by optimizing the mixture ratio and controlling the electric power to be applied.

Here, the thickness of the light shielding layer is preferably from 100 to 120 nm from the viewpoint to make the OD value at the visible light region from 4.0 to 4.5. Further, it is effective to make the thickness of the low-reflecting film from 40 to 70 nm (in a case of one low-reflecting film) or from 5 to 70 nm (the thickness of one layer in the case of at least two low-reflecting films) from the viewpoint to make the reflectance at the visible light region at most 3.0% (excluding the reflectance of glass).

Now, the present invention will be described in further detail with reference to Examples. However, it should be understood that the present invention is by no means restricted to such specific Examples.

EXAMPLES

Using a transparent glass substrate having a thickness of 0.7 mm (non-alkali glass "AN100" manufactured by Asahi Glass Company, Limited) as a transparent substrate, the surface of the glass substrate was washed with a detergent to make the surface of the glass substrate clean, and a light shielding layer consisting of metal components as identified in Table 1 was formed thereon in a thickness of 110 nm by an in-line DC sputtering apparatus. The composition (mass %) of each light shielding layer was first measured by ICP emission spectrometry under Ar gas 100% as an atmospheric gas to be used during sputtering. Then, film formation was carried out again by changing the sputtering atmosphere alone as identified by the Ar:$N_2$ gas flow ratio in the column "Atmosphere" in Table 2, and properties were measured. Here, values in parentheses in the column "Atmosphere" are amounts of nitrogen (vol %) based on the entire atmospheric gas. Further, the power of the sputtering was constant at 650 W. Examples 1, 2, 3, 7 and 9 are Examples of the present invention, and Examples 4, 5, 6 and 8 are Comparative Examples.

TABLE 1

| EX. | Ni | Mo | Ta | Nb | Fe | Al | Zr | Cr |
|---|---|---|---|---|---|---|---|---|
| 1 | 70 | 19 | 5 | 0 | 3 | 0 | 3 | |
| 2 | 69 | 18 | 5 | 0 | 5 | 0 | 3 | 0 |
| 3 | 69 | 18 | 7 | 0 | 3 | 0 | 3 | 0 |
| 4 | 70.4 | 25.0 | 3.0 | 0.0 | 1.6 | 0.0 | 3.0 | 0.0 |
| 5 | 69 | 25 | 3 | 0 | 0 | 0 | 3 | 0 |
| 6 | 0 | 0 | 0 | 0 | 0 | 0 | 0 | 100 |
| 7 | 73.5 | 20.5 | 3.0 | 0.0 | 3.0 | 0.0 | 0.0 | 0.0 |
| 8 | 73 | 24 | 0 | 3 | 0 | 0 | 0 | 0 |
| 9 | 70 | 20 | 7 | 0 | 0 | 3 | 0 | 0 |

All the light shielding layers in Table 1 had an OD value at the visible light region of at least 3.5. Further, each light shielding layer was evaluated by the following methods and the results are shown in Table 2.

Alkali resistance

The light shielding layer was soaked in a 5 mass % NaOH solution at 75° C. for 30 minutes.

Hydrochloric acid resistance

The light shielding layer was soaked in a 5 mass % HCl solution at 25° C. for 30 minutes.

Sulfuric acid resistance

The light shielding layer was soaked in a 5 mass % $H_2SO_4$ solution at 25° C. for 30 minutes.

Heat resistance

The light shielding layer was heated in the air at 250° C. for 30 minutes.

The alkali resistance, the hydrochloric acid resistance, the sulfuric acid resistance and the heat resistance were obtained by measuring a change in the OD value before and after the soaking in each chemical by an optical densitometer ("TD-904" manufactured by Macbeth), and shown in columns "Alkali", "HCl", "$H_2SO_4$" and "Heat resistance" respectively by percentage. It is considered that one with a rate of change of less than 3% of the initial OD value is good, one with a rate of at least 3% and less than 6% is relatively poor, and one with a rate of at least 6% is inadequate.

Water resistance

The light shielding layer was soaked in a boiling pure water for 60 minutes, a change in the OD value before and after the soaking was measured by an optical densitometer ("TD-904" manufactured by Macbeth) and shown in the column "water resistance" in Table 2 by percentage. It is considered that a light shielding layer with a change of at most 6% can be used practically.

Etching rate

It was obtained from a time until the light shielding layer disappeared when etching was carried out by using, as an etchant, a mixed liquid of 12 mass % of ammonium cerium (IV) nitrate and 6 mass % of perchloric acid which is used for patterning of conventional chromium with stirring, and shown in the column "E/R" in Table 2. The etching rate is preferably from 0.5 to 3.0 nm/sec, whereby the etching rate can be adjusted to be equal to the etching rate of a metal chromium film without deteriorating light shielding property, chemical resistance and patterning property, by adding and adjusting $N_2$ in the atmosphere during sputtering. Here, the unit in Table 2 is nm/sec.

Patterning property

A posiresist (FH-2406: manufactured by Fuji Hunt) was coated by a spin coater on a light shielding layer of a sample thin film by means of a conventional photolithography process, followed by exposure, development and etching to carry out patterning of the light shielding layer. The etchant was a mixed liquid of 12 mass % of ammonium cerium(IV) nitrate and 6 mass % of perchloric acid in the same manner as the evaluation of the etching rate. Evaluation standards are ○: patterning with a line width at a level of 6 μm could be conducted by optimizing the etching time alone; and △: patterning was difficult or midway therebetween, and the results are shown in the column "Pattern" in Table 2.

With respect to the light shielding layer having a metal component composition as identified in Example 7 in Table 1, the hydrochloric acid resistance of the film subjected to sputtering in an atmosphere of Ar gas alone containing no $N_2$ changed by at a level of 5%, whereas the hydrochloric acid resistance of the film subjected to sputtering in an atmosphere of Ar:$N_2$=30:4 (gas flow ratio) was at a level of 0.7% as shown in Example 7 in Table 2, and the acid resistance improved due to nitriding without impairing other resistances.

Further, a low-reflecting film having a metal component composition as identified in Example 4 in Table 1 was formed in a thickness of 50 nm under the same conditions as formation of the light shielding layer except that the atmosphere during sputtering was Ar:$CO_2$=8:22 (gas flow ratio) Then, on the low-reflecting film, each of light shielding layers having the same metal component compositions as in Examples 1, 2, 3, 7 and 9 in Table 1 was formed in a thickness of 110 nm by adjusting the $N_2$ concentration in the atmosphere during sputtering so that the etching rate of the light shielding layer after film formation would be from 2.5 to 3.0 nm/sec, within a range of Ar:$N_2$=30:0 to 8 (gas flow ratio).

The etching rates of the obtained two-layer black matrices were from 2.5 to 3.0 nm/sec, and the chemical resistance and the patterning property were at the same level as the case of the light shielding layer alone. Further, the luminous reflectance was at a level of 1.5%, and low-reflecting black matrices were formed.

As mentioned above, with the black matrix of the present invention, the etching rate during patterning can be controlled to be the same level as that of a metal chromium film, and the black matrix of the present invention has adequate acid resistance, alkali resistance, heat resistance and water resistance in a color filter production process. Further, an etchant for a metal chromium film which has conventionally been used can be used as it is.

What is claimed is:

1. A black matrix for liquid crystal display devices which comprises at least one light shielding layer, wherein the light shielding layer substantially comprises the following components:

| | |
|---|---|
| Ni | 40 to 80 mass % |
| Mo | 10 to 59 mass % |
| Ta + Nb | 0.5 to 8 mass % |
| Fe + Al | 0.5 to 10 mass %. |

2. The black matrix for liquid crystal display devices according to claim 1, wherein the light shielding layer further contains Zr in an amount of at most 7 mass %.

3. A color filter provided with the black matrix as defined in claim 2.

4. A liquid crystal display device provided with the black matrix as defined in claim 2.

5. A color filter provided with the black matrix as defined in claim 1.

6. A liquid crystal display device provided with the black matrix as defined in claim 1.

7. A black matrix for liquid crystal display devices which comprises at least one light shielding layer, wherein the light shielding layer substantially comprises the following components:

TABLE 2

| Ex. | Alkali | HCl | $H_2SO_4$ | Heat resistance | Water resistance | E/R | Pattern | Atmosphere |
|---|---|---|---|---|---|---|---|---|
| 1 | 0.6 | 1.6 | 0.2 | 0.7 | 6.0 | 2.5 | ○ | 30:3.8 (11.2%) |
| 2 | 0.5 | 0.8 | 0.3 | 1.0 | 5.0 | 1.5 | ○ | 30:5.0 (14.3%) |
| 3 | 0.7 | 0.9 | 0.1 | 0.9 | 5.0 | 1.5 | ○ | 30:5.8 (16.2%) |
| 4 | 0.2 | 1.0 | 0.1 | 0.6 | 3.0 | 5.0 | ○ | 30:0 (0.0%) |
| 5 | 0.7 | 2.0 | 1.0 | 0.4 | 17.0 | 5.0 | ○ | 30:0 (0.0%) |
| 6 | 0.3 | 0.0 | 0.2 | 1.9 | 0.0 | 3.0 | ○ | 30:4.5 (13.0%) |
| 7 | 0.5 | 0.7 | 0.5 | 0.2 | 1.4 | 2.8 | ○ | 30:4 (11.8%) |
| 8 | 0.5 | 2.0 | 1.0 | 1.0 | 14.0 | 0 | ○ | 30:0 (0.0%) |
| 9 | 0.5 | 1.7 | 0.5 | 0.2 | 1.5 | 1.8 | ○ | 30:7.2 (19.4%) |

| | |
|---|---|
| Ni | 40 to 80 mass % |
| Mo | 10 to 59 mass % |
| Ta | 0.5 to 8 mass % |
| Fe | 0.5 to 10 mass %. |

8. The black matrix for liquid crystal display devices according to claim 7, wherein the light shielding layer further contains Zr in an amount of at most 7 mass %.

9. A color filter, provided with the black matrix as defined in claim 7.

10. A liquid crystal display device provided with the black matrix as defined in claim 7.

11. A black matrix for liquid crystal display devices which comprises at least one light shielding layer, wherein the light shielding layer substantially comprises the following components:

| | |
|---|---|
| Ni | 60 to 78 mass % |
| Mo | 12 to 30 mass % |
| Ta + Nb | 2 to 7 mass % |
| Fe + Al | 1 to 6 mass %. |

12. The black matrix for liquid crystal display devices according to claim 11, wherein the light shielding layer further contains Zr in an amount of at most 4 mass %.

13. A color filter provided with the black matrix as defined in claim 12.

14. A liquid crystal display device provided with the black matrix as defined in claim 12.

15. A color filter provided with the black matrix as defined in claim 11.

16. A liquid crystal display device provided with the black matrix as defined in claim 11.

17. A black matrix for liquid crystal display devices which comprises at least one light shielding layer, wherein the light shielding layer substantially comprises the following components:

| | |
|---|---|
| Ni | 60 to 78 mass % |
| Mo | 12 to 30 mass % |
| Ta | 2 to 7 mass % |
| Fe | 1 to 6 mass %. |

18. The black matrix for liquid crystal display devices according to claim 17, wherein the light shielding layer further contains Zr in an amount of at most 4 mass %.

19. A color filter provided with the black matrix as defined in claim 17.

20. A liquid crystal display device provided with the black matrix as defined in claim 17.

* * * * *